United States Patent [19]

Li et al.

[11] 4,082,820

[45] Apr. 4, 1978

[54] HIGH SOFTENING MALEIC ANHYDRIDE COPOLYMERS

[75] Inventors: George S. Li, Aurora; Richard J. Jorkasky, II, Walton Hills, both of Ohio

[73] Assignee: The Standard Oil Company, Cleveland, Ohio

[21] Appl. No.: 806,576

[22] Filed: Jun. 15, 1977

[51] Int. Cl.$^2$ .......................................... C08F 279/02
[52] U.S. Cl. ................................................ 260/879
[58] Field of Search ....................................... 260/879

[56] References Cited

U.S. PATENT DOCUMENTS

| | | | |
|---|---|---|---|
| 3,947,527 | 3/1976 | Li et al. | 260/879 |
| 3,950,454 | 4/1976 | Hensley et al. | 260/879 |
| 4,020,128 | 4/1977 | Aziz et al. | 260/879 |

*Primary Examiner*—William F. Hamrock
*Attorney, Agent, or Firm*—John F. Jones; Larry W. Evans

[57] ABSTRACT

Polymeric compositions having good impact resistance and high softening temperatures which are composed of a conjugated diene monomer, such as butadiene, maleic anhydride, indene, and optionally styrene, are described.

4 Claims, No Drawings

HIGH SOFTENING MALEIC ANHYDRIDE COPOLYMERS

The present invention relates to novel polymeric compositions which have good impact strength and high softening temperatures, and more particularly pertains to high softening, impact-resistant compositions of low creep characteristics which are composed of a conjugated diene monomer, maleic anhydride, indene, and optionally styrene, and to a process for preparing them.

The novel polymeric products of the present invention are prepared by polymerizing maleic anhydride and indene, optionally with styrene, in the presence of a preformed rubbery polymer composed of a conjugated diene monomer, such as butadiene.

The conjugated diene monomers useful in the present invention include butadiene-1,3, isoprene, chloroprene, bromoprene, cyanoprene, 2,3-dimethyl-butadiene-1,3, and the like. The most preferred for the purpose of this invention are butadiene and isoprene because of their ready availability and copolymerization tendencies.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is solution polymerization in an organic solvent in the substantial absence of molecular oxygen in the temperature range of from 0° to 100° C. Suitable solvents are methyl ethyl ketone, acetone and benzene. Most preferred solvent is methyl ethyl ketone.

The rubbery polymers useful in this invention are homopolymers of the conjugated diene monomers mentioned above as well as copolymers of these dienes and another monomer component such as acrylonitrile, methacrylonitrile, styrene, alpha-methyl styrene, the vinyl toluenes, ethyl acrylate, the propyl acrylates, the butyl acrylates, butyl methacrylate, and mixtures thereof, wherein there is present in the polymer at least 50% by weight of polymerized diene monomer.

The preferred polymeric compositions embodied herein are those resulting from the polymerization of 100 parts by weight of (A) from about 0 to 80% by weight of styrene, (B) from about 1 to 50% by weight of maleic anhydride, and (C) from about 1 to 60% by weight of indene, wherein the given percentages of (A), (B) and (C) are based on the combined weight of (A) plus (B) plus (C), in the presence of from 1 to 40 parts by weight of (D) a rubbery polymer of at least 50% by weight of a conjugated diene monomer selected from the group consisting of butadiene and isoprene and up to 50% by weight of at least one member selected from the group consisting of styrene, alpha-methyl styrene, the vinyl toluenes, acrylonitrile, methacrylonitrile, ethyl acrylate, the propyl acrylates, the butyl acrylates, and the butyl methacrylates.

More specifically, the present invention can be illustrated in the polymerization of a mixture of styrene, maleic anhydride and indene in the presence of a preformed rubber composed of butadiene and styrene to produce a product having excellent impact strength and a high ASTM heat-distortion temperature. Preferably, the polymerization mixture should contain 0 to 70% by weight of styrene, 5 to 46% by weight of maleic anhydride, and 5 to 54% by weight of indene.

Preferably, the rubbery copolymer of the conjugated diene should contain more than 50% by weight of diene based on the total diene and other monomer component and the rubbery copolymer should contain from 50 to 90% and, most preferably, 60 to 80% by weight of polymerized diene monomer, the remaining 40 to 20% by weight being the polymerized other monomer component.

In the foregoing polymerization, it is preferred that from about 1 to 40 and, more preferably, about 1 to 20 parts of the rubbery diene polymer be employed for each 100 parts of combined styrene, maleic anhydride and indene. It has generally been found that as the relative amount of the rubbery diene polymer is increased in the final polymeric product, the impact strength increases and the heat-distortion temperature decreases somewhat. It is generally preferred to use just enough of the rubbery diene polymer to impart the desired impact strength to the polymeric product and to retain the optimum heat-distortion temperature in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc., into pipes, strands, sheets films, bottles, and the like.

In the following illustrative examples, the amounts of ingredients are expressed in parts by weight unless otherwise indicated.

EXAMPLE 1

A. A resin which is outside the scope of the present invention was prepared by placing 75 parts of styrene, 75 parts of methyl ethyl ketone, 15 parts of an SBR rubber (25% by weight of styrene and 75% by weight of butadiene) and 0.2 parts of azobisisobutyronitrile in a polymerization reactor, heating this mixture to 83°–85° C with stirring until the rubber dissolved, sweeping the reactor void with nitrogen, and then with continued stirring and heating at 83°–85° C continuously adding in a uniform manner a mixture of 23 parts of maleic anhydride and 25 parts of methyl ethyl ketone over a period of 5.5 hours. The resulting resin was isolated by coagulation with a 1:1 volume mixture of benzene:petroleum ether followed by drying of the solid to constant weight. The resin was found to have an ASTM heat-distortion temperature of 108° C and a notched Izod impact strength of 0.81 foot pounds per inch of notch.

B. A polymer which is within the scope of this invention was prepared in accordance with A of this Example using an initial charge to the reactor of 50 parts of styrene, 75 parts of methyl ethyl ketone, 15 parts of SBR rubber and 0.2 parts of azobisisobutyronitrile. The continuous feed was made up of 23 parts of maleic anhydride, 27 parts of indene and 25 parts of methyl ethyl ketone. The total reaction time was 6 hours. The final resin was found to have an ASTM heat-distortion temperature of 163° C and a notched Izod impact strength of 0.60 foot pounds per inch of notch.

C. A resin without rubber which is outside the scope of this invention was prepared from 50 parts of styrene, 23 parts of maleic anhydride and 27 parts of indene by the procedure of B of this Example. The final resin was too brittle to mold for ASTM heat-distortion temperature measurement and notched Izod impact strength measurement.

EXAMPLE 2

A resin was prepared by the procedure of Example 1B using as initial reactor charge 50 parts of styrene, 15 parts of SBR rubber, 75 parts of methyl ethyl ketone and 0.2 parts of azobisisobutyronitrile. The continuous feed was composed of 28 parts of maleic anhydride, 22 parts of indene and 25 parts of methyl ethyl ketone. The final resin was found to have an ASTM heat-distortion temperature of 146° C and a notched Izod impact strength of 0.84 foot pounds per inch of notch.

EXAMPLE 3

The procedure of Example 1B was followed using in the initial reactor charge 30 parts of styrene, 15 parts of SBR rubber, 75 parts of methyl ethyl ketone and 0.2 part of azobisisobutyronitrile. The continuous feed was made up of 38 parts of maleic anhydride, 32 parts of indene and 25 parts of methyl ethyl ketone. The final resin was found to have an ASTM heat-distortion temperature of 128° C and a notched Izod impact strength of 0.89 foot pounds per inch of notch.

EXAMPLE 4

The procedure of Example 1B was followed using as initial reactor charge 20 parts of styrene, 15 parts of SBR rubber, 75 parts of methyl ethyl ketone and 0.2 part of azobisisobutyronitrile. The continuous feed was made up of 43 parts of maleic anhydride, 37 parts of indene and 25 parts of methyl ethyl ketone. The final resin was found to have an ASTM heat-distortion temperature of 139° C and a notched Izod impact strength of 0.79 foot pounds per inch of notch.

EXAMPLE 5

A polymer was prepared in accordance with Example 1B using only an initial charge to the reactor of 46 parts of maleic anhydride, 54 parts of indene, 15 parts of SBR rubber, 100 parts of methyl ethyl ketone and 0.2 part of azobisisobutyronitrile. A total polymerization time of 2.5 hours was employed. The final resin was found to have an ASTM heat-distortion temperature of 163° C and a notched Izod impact strength of 0.46 foot pounds per inch of notch.

EXAMPLE 6

The procedure of Example 1B was followed using an initial polymerization reactor charge of 50 parts of styrene, 75 parts of methyl ethyl ketone and 15 parts of SBR rubber. The continuous feed was made up of 23 parts of maleic anhydride, 27 parts of indene, 25 parts of methyl ethyl ketone and 0.1 part of benzoyl peroxide. The total addition time was 7 hours. The final resin was found to have an ASTM heat-distortion temperature of 152° C and a notched Izod impact strength of 1.80 foot pounds per inch of notch.

EXAMPLE 7

The procedure of Example 1B was followed using as initial charge to the polymerization reactor 50 parts of styrene, 15 parts of SBR rubber, 75 parts of methyl ethyl ketone and 0.1 part of benzoyl peroxide and a continuous feed which was made up of 23 parts of maleic anhydride, 27 parts of indene and 25 parts of methyl ethyl ketone. The feed time was 4.5 hours. The final resin was found to have an ASTM heat-distortion temperature of 164° C and a notched Izod impact strength of 2.02 foot pounds per inch of notch.

EXAMPLE 8

The procedure of Example 1B was followed using as initial charge to the polymerization reactor 50 parts of styrene, 15 parts of SBR rubber, 75 parts of methyl ethyl ketone and 0.2 part of benzoyl peroxide and a continuous feed made up of 30 parts of maleic anhydride, 20 parts of indene and 25 parts of methyl ethyl ketone. The final resin was found to have an ASTM heat-distortion temperature of 169° C and a notched Izod impact strength of 1.26 foot pounds per inch of notch.

We claim:
1. The polymeric composition resulting from the polymerization of 100 parts by weight of
    (A) from about 0 to 80% by weight of styrene,
    (B) from about 1 to 50% by weight of maleic anhydride, and
    (C) from about 1 to 60% by weight of indene,
wherein the given percentages of (A), (B) and (C) are based on the combined weight of (A) plus (B) plus (C), in the presence of from 1 to 40 parts by weight of
    (D) a rubbery polymer of at least 50% by weight of a conjugated diene monomer selected from the group consisting of butadiene and isoprene and up to 50% by weight of at least one member selected from the group consisting of styrene, alpha-methyl styrene, the vinyl toluenes, acrylonitrile, methacrylonitrile, ethyl acrylate, the propyl acrylates, the butyl acrylates, and the butyl methacrylates.

2. The composition of claim 1 wherein (D) is a styrene-butadiene rubber.

3. The process comprising polymerizing in the presence of a free-radical initiator and in the substantial absence of molecular oxygen at a temperature in the range of from 0° to 100° C 100 parts by weight of
    (A) from about 0 to 80% by weight of styrene,
    (B) from about 1 to 50% by weight of maleic anhydride, and
    (C) from about 1 to 60% by weight of indene,
wherein the given percentages of (A), (B) and (C) are based on the combined weight of (A) plus (B) plus (C), in the presence of from 1 to 40 parts by weight of
    (D) a rubbery polymer of at least 50% by weight of a conjugated diene monomer selected from the group consisting of butadiene and isoprene and up to 50% by weight of at least one member selected from the group consisting of styrene, alpha-methyl styrene, the vinyl toluenes, acrylonitrile, methacrylonitrile, ethyl acrylate, the propyl acrylates, the butyl acrylates, and the butyl methacrylates.

4. The process of claim 3 wherein (D) is a styrene-butadiene rubber.

* * * * *